United States Patent [19]

Brighton

[11] Patent Number: 5,746,283
[45] Date of Patent: May 5, 1998

[54] ELECTRIC PROPULSION SYSTEM FOR A VEHICLE

[76] Inventor: Everett W. Brighton, P.O. Box 2412, Palmer, Ak. 99645

[21] Appl. No.: 637,047

[22] Filed: Apr. 24, 1996

[51] Int. Cl.$^6$ .................................................. B60K 1/00
[52] U.S. Cl. ...................... 180/65.3; 180/65.4; 180/65.8
[58] Field of Search ........................... 180/65.3, 65.4, 180/65.8, 165, 2.2

[56] References Cited

U.S. PATENT DOCUMENTS

| | | | |
|---|---|---|---|
| 3,876,925 | 4/1975 | Stoeckert | 180/65 |
| 4,498,551 | 2/1985 | Arbisi | 180/65.5 |

*Primary Examiner*—Brian L. Johnson
*Assistant Examiner*—Jonathan E. Butts
*Attorney, Agent, or Firm*—Michael J. Tavella

[57] ABSTRACT

A system using a stored power unit, such as a battery pack, to supply electric current for driving an electric motor-driven generator, which in turn, drives a propulsion motor drive system. The propulsion motor drive system uses either one, two or several electric propulsion motors to propel a vehicle. The system has a control device that diverts power from the generator output to the stored power unit to recharge and maintain the stored power unit when operating conditions permit. Amorphous energy sources, such as a wind turbine that is mounted on the vehicles roof, for example, can also supply recharging power. By use of strict energy control, the vehicle may be operated over many miles without having to recharge the batteries from a utility power source.

18 Claims, 4 Drawing Sheets

ELECTRIC PROPULSION SYSTEM FOR A VEHICLE

This invention relates to electric propulsion systems for vehicles and particularly to electric propulsion systems for vehicles using amorphous external supplemental power sources.

BACKGROUND OF THE INVENTION

The automobile and related fossil fuel drive vehicles were created about 100 years ago. Since their beginning, automobiles generally have used petroleum fuels to operate internal combustion engines used in these vehicles. Supplies of these fuels are shrinking. Moreover, the use of fossil fuels has been suggested as contributing to a climate change phenomenon known as "global warming." As a result, many types of vehicles have been developed recently that use alternatives to fossil fuels. Electric vehicles are one alternative to fossil fuel cars. Electric vehicles use large banks of rechargeable batteries to operate electric motors. Presently, these vehicles can operate only over short distances-about 100 miles or so-before they need recharging.

Some hybrid vehicles have also been developed. These vehicles use a fossil fuel engine that is augmented with electric motors and battery bank. The fossil fuel engine can start the vehicle in motion after which, the battery bank operates electric motors. It is also possible for the fossil fuel engine to recharge the batteries while this engine is in use.

One such design is U.S. Pat. No. 4,602,694 to Weldon uses a wheel that extends beneath the vehicle. This wheel can be stored in the vehicle passenger compartment when not in use. The wheel operates when the vehicle is moving down hills and uses the momentum of the vehicle to drive a small generator to charge batteries.

Many other designs use some type of alternative power sources to help charge batteries. Some of these auxiliary power devices do not add much in the way of supplemental power.

SUMMARY OF THE INVENTION

The instant invention uses a stored power unit, such as a battery pack, to provide electric current for driving an electric motor-driven generator. This generator then drives a propulsion motor drive system. The propulsion motor drive system uses either one, two or several electric propulsion motors. For example, in one configuration, a single propulsion motor is connected to the transmission of an automobile. It is also possible to install individual propulsion motors for each wheel. Another feature of this system is a microprocessor control system. This system senses when the main drive propulsion units do not require power from the main generator. When this occurs, the microprocessor diverts the generator output from the propulsion motors to the stored power unit to recharge and maintain the stored power unit. The microprocessor also can sense the electrical needs of the propulsion motors and can provide an additional high energy boost to the propulsion motors to meet sudden peak demands and other emergencies.

Amorphous energy sources, such as a wind turbine that is mounted on a vehicle's roof, for example, can also provide recharging power. These sources can be attached to other points on the vehicle as well. By use of strict energy control the vehicle may be operated over many miles without having to recharge the batteries from a utility power source. Moreover, unlike the Weldon design, there are no intruding parts that get in the way of the driver and passengers. The system also incorporates an emergency bypass circuit that allows an operator to directly connect the stored power unit to the propulsion motors if the control system fails. The bypass system allows the vehicle to be moved to a repair facility or to a place where help can be obtained. Finally, this design allows control of the system components so that, under normal conditions, the operation is transparent to the user.

It is an object of this invention to provide a stored power unit, such as a battery pack, to provide electric current for driving an electric motor-driven generator, which in turn, drives a propulsion motor drive system.

It is another object of this invention to provide an electric drive system that uses either one, two or several electric propulsion motors.

It is yet another object of this invention to provide an electric drive propulsion system that can connect a single propulsion motor to currently designed transmissions of automobiles or other vehicles and equipment.

It is yet another object of this invention to provide an electric drive propulsion system that can connect an individual propulsion motor to each wheel of a vehicle.

It is yet another object of this invention to provide an electric drive propulsion system that uses a microprocessor control system that senses when the main drive propulsion units do not require power from the main generator and can then divert the generator output from the propulsion motors to the stored power unit to recharge and maintain the stored power unit.

It is yet another object of this invention to provide an electric drive propulsion system that has a microprocessor that also can sense the electrical needs of the propulsion motors and can provide an additional high energy boost to the propulsion motors to meet sudden peak demands and other emergencies.

It is yet another object of this invention to provide an electric drive propulsion system that utilizes amorphous energy sources to provide recharging power.

It is yet a further object of this invention to provide an emergency bypass circuit that allows an operator to directly connect the stored power unit to the propulsion motors if the control system fails.

DETAILED DESCRIPTION OF THE INVENTION

Figure 1:
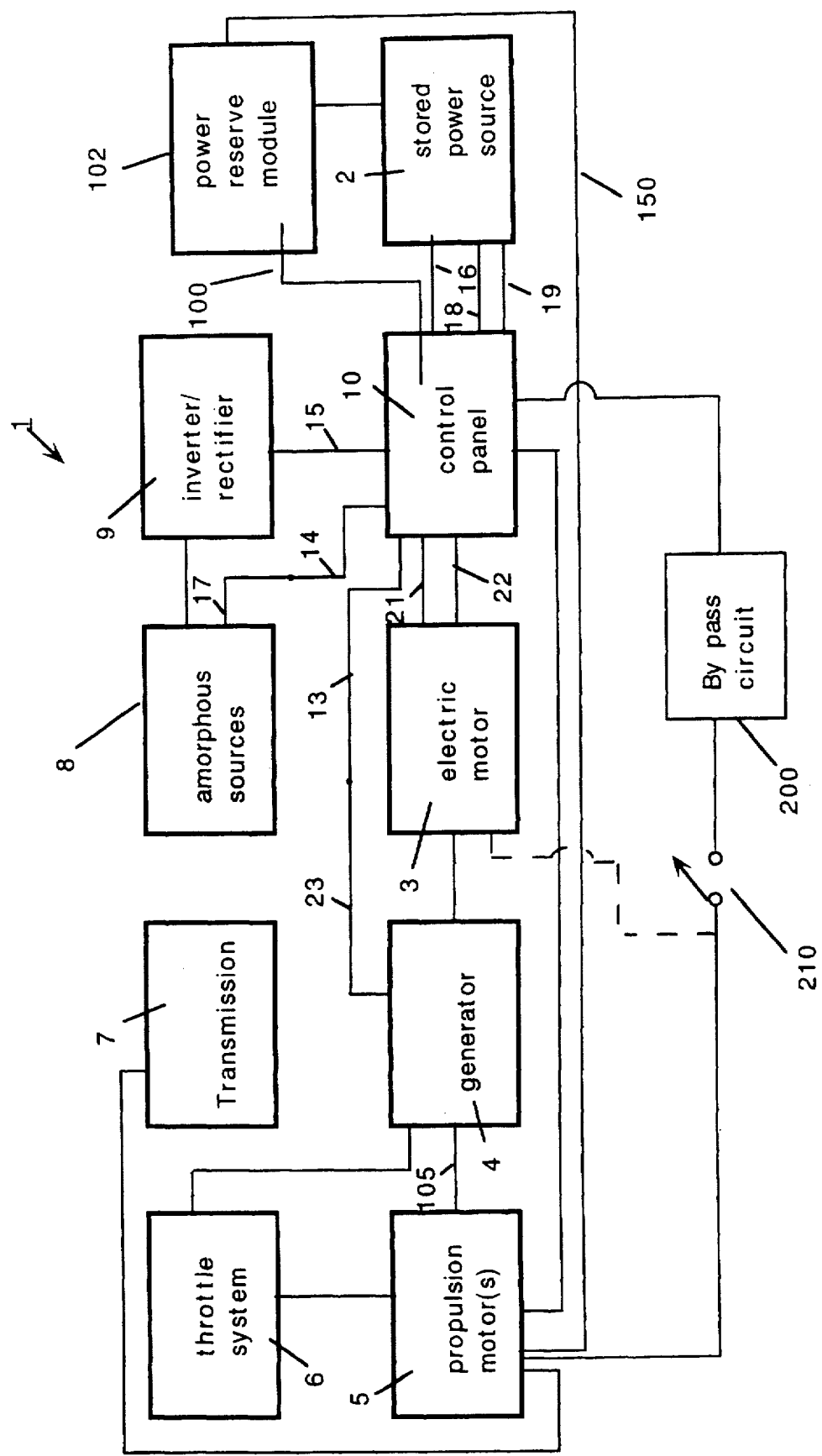
FIG. 1 is a block diagram of the invention showing the components.

Referring now to FIG. 1, an electric propulsion system 1 for a vehicle 1a is shown in block diagram. The propulsion system 1 has a stored power unit 2, with an output voltage and power capacity sufficient to drive a primary drive motor 3. The primary drive motor 3 in turn drives a primary alternator or generator 4. The output of the generator 4 drives a set of electric propulsion motors 5. The number of electric propulsion motors 5 varies from one to four or more, depending on the intended use. The propulsion motors 5 can be used to drive an automobile or other vehicle, or other piece of equipment. In this application, I describe how the device is used in an automobile as an illustrative example. Of course, the device can be used in other vehicles, conveyances, or other equipment, with the necessary changes in structure being obvious to those of ordinary skill.

As discussed above, for an auto, the generator 4 can be either directly or indirectly connected to a propulsion motor 5, which can then be connected to some type of geared transmission 7 to drive vehicles. Alternatively, four propulsion motors 5 can be used—one placed at each wheel 130—to drive a vehicle. See, e.g., FIG. 7. In the latter case, the four motors 5 have necessary electric connections to the drive generator 4.

In its simplest form, the propulsion system 1 has a stored power unit 2, such as a battery set; a drive motor 3 connected to the stored power unit 2; a drive generator 4 connected to the drive motor 3; and a propulsion motor 5 to drive the vehicle. Besides these basic components, the propulsion system 1 for use in autos must be connected to a throttle system 6 to control the speed of the vehicle. If one propulsion motor 5 is being used, it must also be connected to some type of vehicle transmission 7 commonly used in vehicles.

The propulsion system 1 cannot operate for long periods of time without some means for charging the stored power unit 2, unless the stored power unit 2 is unrealistically large. Therefore, I have designed a system to provide charging for the stored power unit 2. There are two sources of charging current contemplated in my design. First, various amorphous charging sources 8 are added to the structure of the vehicle. These sources can be photocells mounted on the vehicle surfaces (not shown), small wind turbines mounted on the roof 45 or hood of the vehicle, or on the vehicle's antenna 50, or other similar sources. Moreover, the placement of these sources can be on the sides of the vehicle, under the vehicle (with proper protection) or even in the front grill 170 of the vehicle. Two examples of turbines are shown in FIGS. 3-6. The amorphous sources 8 are connected to the system through inverters or rectifiers 9 to produce voltages and currents that are compatible with the overall electrical system. As, discussed below, these sources are controlled by a control panel 10 that has a central processing unit (CPU) 20.

The second source of charging power is the primary generator 4 and propulsion motors 5. While, the vehicle is moving, there are times when the momentum of the vehicle is such that the generator 4 is idling. At these times, the output of the generator 4 can be fed back to maintain the power output of the stored power unit 2. Moreover, it is also possible at this time for the propulsion motors 5 to be driven like generators. In these times, the output of these motors 5 can also be diverted through the control panel 10 to the stored power unit 2. Because such times last for only brief periods, the amorphous power sources 8 are needed to ensure steady maintenance of the stored power unit 2, such as charging a main battery bank. As with the amorphous sources 8, maintaining the stored power unit 2 with the generator is controlled by the CPU 20, as discussed below.

Figure 2:
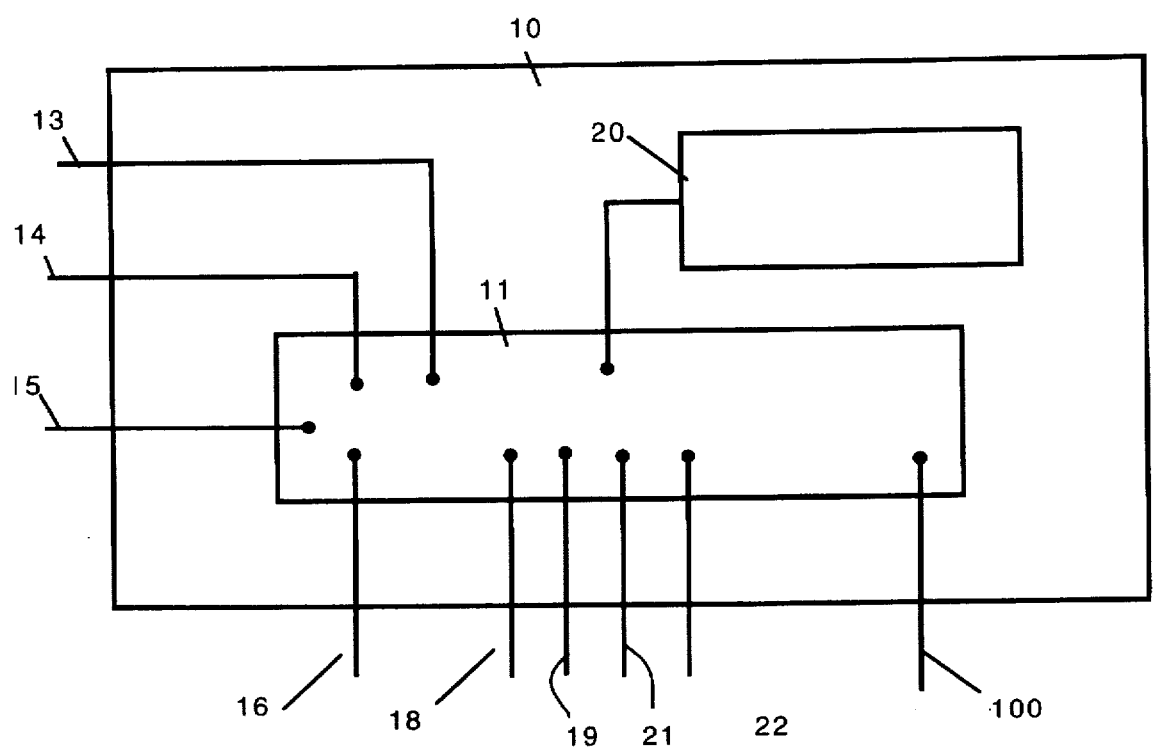
FIG. 2 is a front view of the control panel showing the various connections to a microprocessor control system.

Referring now to FIG. 2, to control the operation of all the power sources and motors, a central processing unit (CPU) 20 is used to monitor the operations and to make the necessary switching of power sources to ensure smooth operation of the device. The CPU 20 has two broad functions. The first is to act as a means for controlling the flow of electricity from and to the stored power unit 2, the generator 4 and the other downstream components and the amorphous sources of power 8. The second function of the CPU 20 is to act as a means for directing any available surplus electrical energy from the propulsion system 1 (the generator and propulsion motors) and/or the amorphous sources 8 back to the stored power unit 2.

The CPU 20, which is a microprocessor, is installed in a control panel 10 as shown in FIG. 2. The control panel 10 has a terminal block 11, which has a number of terminals and leads: 13, 14, 15, 16, 18, 19, 21, and 22. As shown on FIG. 1, lead 13 connects to lead 23 of the generator. Lead 14 connects any one of the amorphous sources through lead 17 on the amorphous source. Lead 15 connects to the inverter/rectifier. Leads 16, 18 and 19 connect to the stored power unit. Leads 21 and 22 connect to the electric drive motor.

Figure 8:
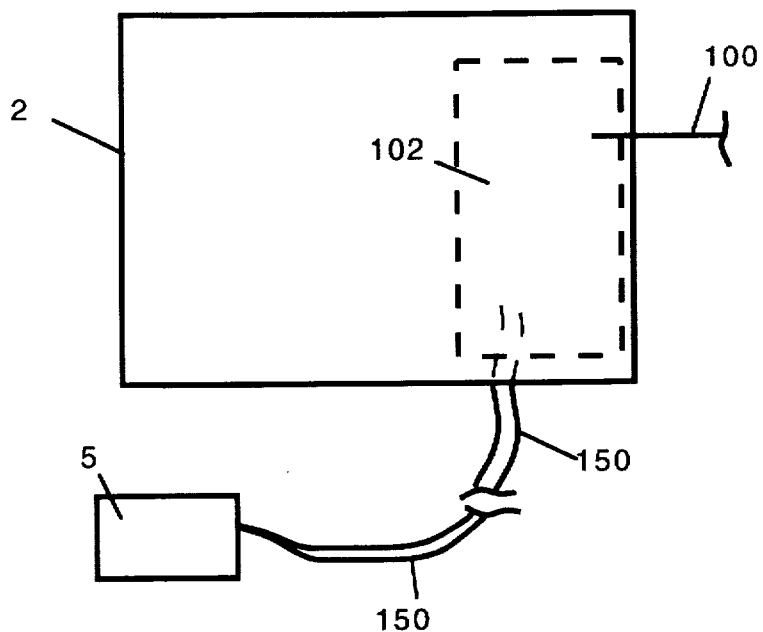
FIG. 8 is a detail of the stored power unit showing the reserve module installed.

Referring now to FIGS. 2 and 8, lead 100 connects to the power reserve module 102. When the vehicle is experiencing a power loss such as when climbing a steep hill, the microprocessor 20 senses this power drop. Then, the microprocessor 20 sends a signal through lead 100 to the power reserve module 102 within the stored power source, such as a reserve battery bank, to provide an extra boost of energy to the propulsion motors 5 directly through leads 150. By bypassing the motor-generator system, the extra power boot provides instant power to the propulsion motor 5 or motors when they need it most. This operation uses switches, relays and other components known in the art.

Figure 3:
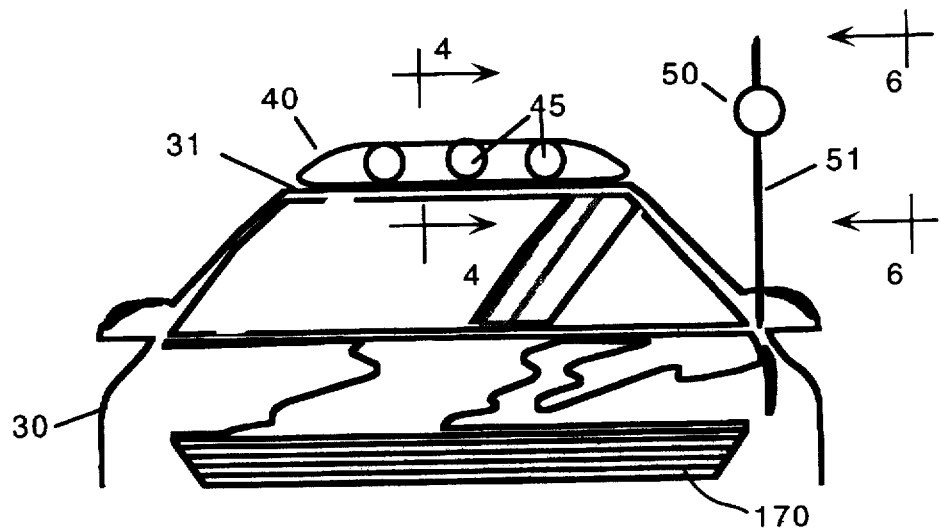
FIG. 3 is a front detail view of the top of a car showing two wind turbine attachments.
Figure 4:
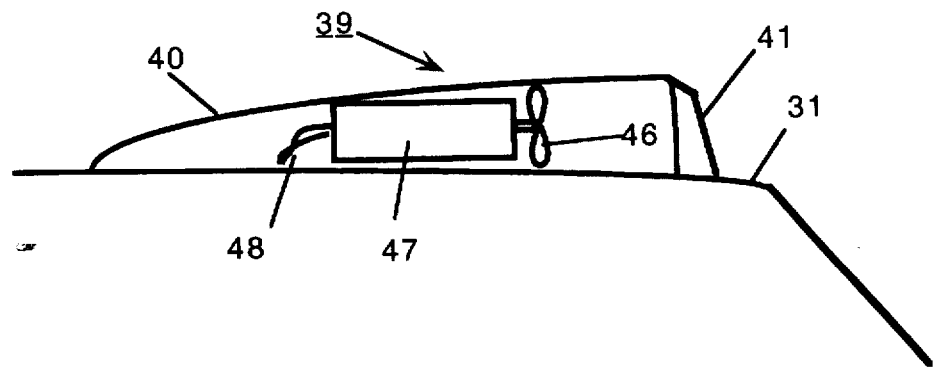
FIG. 4 is a side detail view of the top turbine attachment.
Figure 5:
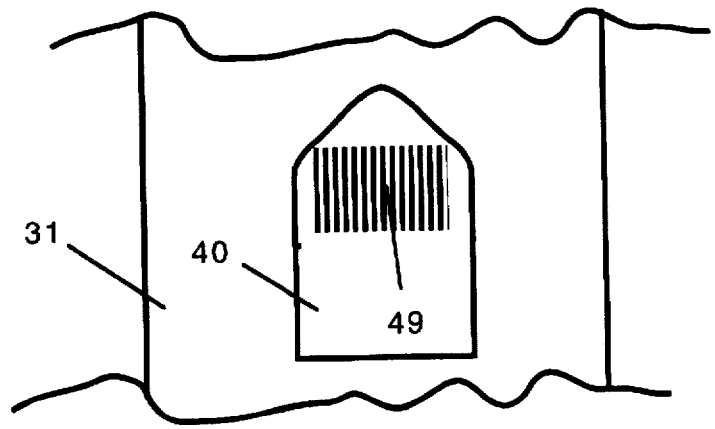
FIG. 5 is a top detail view of the top turbine attachment.

Referring now to FIGS. 3-6, details of two types of amorphous power sources are shown. FIG. 3 shows a partial front view of a typical car 30 on the top 31 of the car 30 is a wind turbine system 39, that has a housing 40. The housing 40 is designed to be streamlined to provide smooth airflow over the vehicle. Inside the wind turbine housing 40 are a number of small turbines 45. It is possible to use one larger turbine, but this is not preferred because it gives the wind turbine housing 40 too high a profile. This Referring to FIG. 4, the wind turbines 45 have a set of blades 46 that turn with the wind. FIG. 4 also shows a grill 41 that keeps dirt and debris from entering the housing 40. The grill 41 is not shown in FIG. 3 for clarity. The blades are connected to a generator 47 that has leads 48. The leads 48 connect to the leads of the control panel 10 and any inverters or other power conditioners 9 as needed. FIG. 5 shows a top view of the wind turbine housing 40. This figure shows a grill 49 formed at the rear of the wind turbine housing 40 to let the wind passing through the housing 40 escape into the atmosphere.

Figure 6:
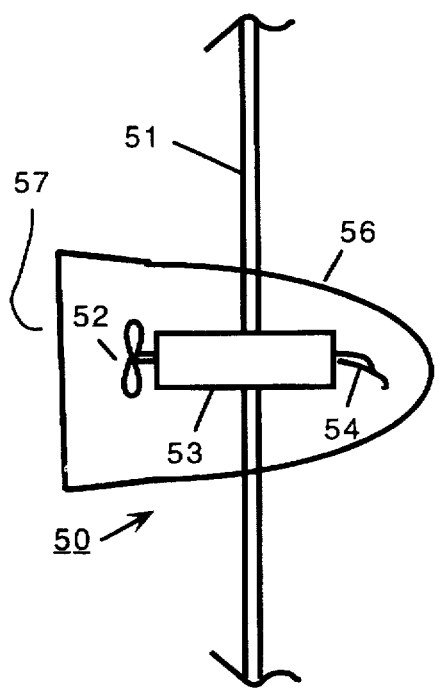
FIG. 6 is a side detail view of a second turbine attachment device.

FIGS. 3 and 6 also show a small wind turbine 50 that is mounted on a antenna or some other similar type vertical shaft 51. FIG. 6 shows a side view of this turbine. Like the turbines above, this unit has a set of blades 52 that turn with the wind. The blades 52 are connected to a generator 53 that has leads 54 that connect to the leads of the control panel 10 through any inverters or other power conditioners 9 as needed. A housing 56 and a grill 57 protect the wind turbine 50 from damage.

Figure 7:
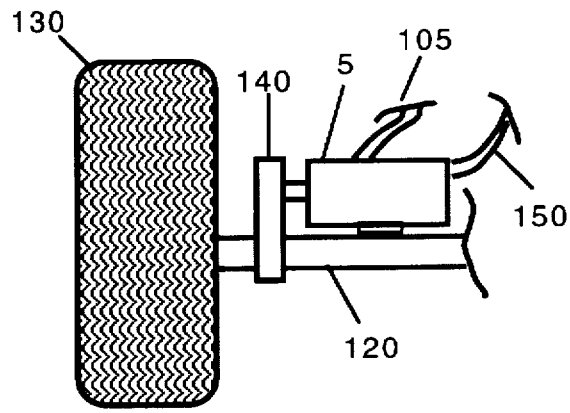
FIG. 7 is a detail view showing a typical propulsion motor attached to a wheel of a vehicle.

FIG. 7 shows details of a typical car wheel 130. Here, separate up to four propulsion motors 5 can be used to connect directly to the vehicle's wheels. FIG. 7 shows one propulsion motor 5 connecting to an axle 120 to drive the wheel 130. The motors 5 can be connected directly to the wheels 130 or can be connected through a speed control mechanism 140 as shown. Leads 105 connect to the main generator. Leads 150 connect to the power reserve module 102, as discussed above.

Finally, FIG. 1 shows a bypass circuit 200. This circuit is used when there is a failure of the control system. Here, a bypass switch 210 is used to connect the stored power unit 2 directly to either the drive motor 3 or the propulsion motors 5. This bypass circuit 200 allows the vehicle 1a to operate long enough to get to a repair facility or to some place where the vehicle can be towed conveniently. Bypass switch 210 may be a hard component located in the cockpit of the vehicle, or can be an automatic relay installed in the engine compartment. In the latter case, the relay activates when monitoring signals from the control panel 10 are lost. In the case of the relay, a hard switch may also be employed as a further back-up.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. An electric propulsion system for a vehicle comprising:
   a) a stored power unit, providing a voltage output;
   b) a means for controlling a flow of electricity from said stored power unit to a plurality of components of said electric propulsion system;
   c) a means for directing any available surplus electrical energy from said electric propulsion system back to said stored power unit, said means for directing any available surplus electrical energy being operably connected to said means for controlling the flow of electricity, and further such that said means for controlling the flow of electricity also control said means for directing any available surplus electrical energy;
   d) an electric drive motor, controlled by said means for controlling the flow of electricity and being operably connected to said stored power unit;
   e) an electric generator, rotatably attached to said electric drive motor and being electrically connected to said means for directing any available surplus electrical energy;
   f) at least one propulsion motor, electrically connected to said electric generator;
   g) a means for propelling said vehicle, operably connected to said propulsion motor;
   h) a power reserve module, integrally installed within said stored power unit, said power reserve module being in operable communication with said means for controlling the flow of electricity from said stored power unit, said power reserve module also being in direct electrical communication with said propulsion motor such that when said means for controlling the flow of electricity from said stored power unit senses a loss of power from said electric generator due to increased loading, said power reserve module provides additional energy directly to said propulsion motor;
   i) a bypass circuit, electrically connected between said stored power unit and said propulsion motor; and
   j) switch means operably connected to said bypass circuit, whereby said switch means is open during normal operation, and can be closed when said means for controlling the flow of electricity becomes disabled, whereby said bypass circuit can then be used to operate the vehicle in an emergency.

2. The electric propulsion system of claim 1 whereby said means for directing any available surplus electrical energy from said electric propulsion system back to said stored power unit, further comprises a means for directing the flow of electricity generated by an amorphous source of electrical energy that is attached to said vehicle.

3. The electric propulsion system of claim 2 wherein the amorphous source of electrical energy comprises a wind turbine system, fixedly attached to said vehicle.

4. The electric propulsion system of claim 3 wherein said wind turbine system is in electrical communication with said means for controlling the flow of electricity.

5. The electric propulsion system of claim 2 wherein the amorphous source of electrical energy comprises a wind turbine, fixedly attached to a vertical shaft extending upward from said vehicle.

6. The electric propulsion system of claim 5 wherein said wind turbine is in electrical communication with said means for controlling the flow of electricity.

7. The electric propulsion system of claim 3 wherein the wind turbine system comprises at least one wind turbine, fixedly installed in a housing; and a set of leads in electrical communication with said means for controlling the flow of electricity.

8. The electric propulsion system of claim 5 wherein the vertical shaft extending upwards from said vehicle comprises an antenna.

9. The electric propulsion system of claim 1 wherein the means for controlling the flow of electricity includes a microprocessor.

10. The electric propulsion system of claim 1 wherein the means for directing any available surplus electrical energy from said electric propulsion system back to said stored power unit includes a microprocessor.

11. The electric propulsion system of claim 1 whereby said switch means is operated manually by an operator of the vehicle.

12. The electric propulsion system of claim 1 whereby the switch means is operated automatically.

13. An electric propulsion system for a vehicle comprising:
   a) a stored power unit, providing a voltage output;
   b) a propulsion system including 1) an electric drive motor in electrical contact with said stored power unit, ii) an electric generator, rotatably attached to said electric drive motor, and iii) at least one propulsion motor, electrically connected to said electric generator;
   c) a means for propelling said vehicle, operably connected to said propulsion motor;
   d) at least one amorphous source of energy, operatively attached to said vehicle and being in electrical communication with said propulsion system;
   e) a control panel, including a microprocessor, electrically connected to said stored power unit and said propulsion system, said control panel also including a means for directing any available surplus electrical energy from said propulsion system and amorphous sources back to said stored power unit;
   f) a power reserve module, integrally installed within said stored power unit, said power reserve module being in operable communication with said control panel, said power reserve module also being in direct electrical communication with said propulsion motor such that when said control panel senses a loss of power from said electric generator due to increased loading, said power reserve module provides additional energy directly to said propulsion motor;

g) a bypass circuit, electrically connected between said stored power unit and said propulsion motor; and h) switch means operably connected to said bypass circuit, whereby said switch means is open during normal operation, and can be closed when said control panel becomes disabled, whereby said bypass circuit can then be used to operate the vehicle in an emergency.

14. The electric propulsion system of claim 13 wherein the amorphous source of electrical energy comprises a wind turbine system, fixedly attached to said vehicle.

15. The electric propulsion system of claim 14 wherein said wind turbine system is in electrical communication with said control panel.

16. The electric propulsion system of claim 13 wherein the amorphous source of electrical energy comprises a wind turbine, fixedly attached to vertical shaft extending upward from said vehicle.

17. The electric propulsion system of claim 14 wherein the wind turbine system comprises at least one wind turbine fixedly installed in a housing; and a set of leads in electrical communication with said control panel.

18. An electric propulsion system for a vehicle comprising:

a) a stored power unit, providing a voltage output;

b) a propulsion system including: 1) an electric drive motor in electrical contact with said stored power unit; ii) an electric generator, rotatably attached to said electric drive motor; and iii) at least one propulsion motor, electrically connected to said electric generator;

c) a means for propelling said vehicle, operably connected to said propulsion motor;

d) a control panel, including a microprocessor, electrically connected to said stored power unit and said propulsion system, said control panel also including a means for directing any available surplus electrical energy from said propulsion system and amorphous sources back to said stored power unit;

e) at least one wind turbine, fixedly installed in a housing, said wind turbine being in electrical communication with said control panel;

f) a power reserve module, integrally installed within said stored power unit, said power reserve module being in operable communication with said control panel, said power reserve module also being in direct electrical communication with said propulsion motor such that when said control panel senses a loss of power from said electric generator due to increased loading, said power reserve module provides additional energy directly to said propulsion motor;

g) a bypass circuit, electrically connected between said stored power unit and said propulsion motor and switch means operably connected to said bypass circuit, whereby said switch means is open during normal operation, and can be closed when said control panel becomes disabled, whereby said bypass circuit can then be used to operate the vehicle in an emergency.

* * * * *